(12) United States Patent
McGinty et al.

(10) Patent No.: US 10,813,198 B2
(45) Date of Patent: Oct. 20, 2020

(54) AUTOMATED CONTROL METHOD AND APPARATUS

(71) Applicant: Centrica Hive Limited, Windsor, Berkshire (GB)

(72) Inventors: Jonathan McGinty, Windsor (GB); Richard Burke, Windsor (GB); Nicholas Charles Leith, Windsor (GB)

(73) Assignee: Centrica Hive Limited, Windsor (GB)

( * ) Notice: Subject to any disclaimer, the term of this patent is extended or adjusted under 35 U.S.C. 154(b) by 0 days.

(21) Appl. No.: 15/999,174

(22) Filed: Aug. 17, 2018

(65) Prior Publication Data
US 2019/0059143 A1 Feb. 21, 2019

(30) Foreign Application Priority Data

Aug. 18, 2017 (GB) .................................. 1713299.4

(51) Int. Cl.
*H05B 47/19* (2020.01)
*H05B 47/16* (2020.01)
*H04L 12/28* (2006.01)

(52) U.S. Cl.
CPC ......... *H05B 47/19* (2020.01); *H04L 12/2818* (2013.01); *H05B 47/16* (2020.01)

(58) Field of Classification Search
CPC ............ H05B 37/0218; H05B 37/0245; H05B 37/0254; H05B 37/0281; H05B 37/0272;
(Continued)

(56) References Cited

U.S. PATENT DOCUMENTS 6,377,858 B1   4/2002   Koeppe
2001/0052862 A1   12/2001   Roelofs
(Continued)

FOREIGN PATENT DOCUMENTS

GB   2504595 A   2/2014
WO   2014/159131 A2   10/2014
(Continued)

OTHER PUBLICATIONS

Extended European Search Report. European Application No. EP18189638.2, dated Jan. 4, 2019. 17 pages.
(Continued)

*Primary Examiner* — Amy Cohen Johnson
*Assistant Examiner* — Syed M Kaiser
(74) *Attorney, Agent, or Firm* — Meunier Carlin & Curfman LLC

(57) ABSTRACT

There is described a device and method for automatically controlling a lighting system including at least two lighting devices. The method comprises the steps of: determining a set of lighting devices to be controlled in an automated mode; determining a start reference time and an end reference time; and determining that one or more criteria for operating in the automated mode are met. Then a lighting device to be the first activated lighting device is selected from deactivated lighting devices of the set of lighting devices; and the first activated lighting device is activated during a pre-determined time period defined relative to the start reference time. Subsequently a lighting device to be the first deactivated lighting device is selected from activated lighting devices; and the first deactivated lighting device is deactivated during a pre-determined time period defined relative to the end reference time.

20 Claims, 10 Drawing Sheets

(58) Field of Classification Search
CPC .... H05B 37/0227; H05B 47/10; H05B 47/16; H05B 47/19; H05B 47/115; H04L 12/2818
See application file for complete search history.

(56) References Cited

U.S. PATENT DOCUMENTS

| | | | | |
|---|---|---|---|---|
| 2007/0021849 | A1* | 1/2007 | Naono | G06F 8/41 700/37 |
| 2007/0103007 | A1* | 5/2007 | Miki | H05B 47/19 307/149 |
| 2009/0051503 | A1* | 2/2009 | Bowman | H05B 47/16 340/309.4 |
| 2010/0141153 | A1* | 6/2010 | Recker | H05B 47/20 315/149 |
| 2011/0133655 | A1* | 6/2011 | Recker | H05B 45/10 315/159 |
| 2012/0043889 | A1* | 2/2012 | Recker | H05B 47/19 315/86 |
| 2014/0265880 | A1* | 9/2014 | Taipale | H05B 41/14 315/158 |
| 2014/0265897 | A1* | 9/2014 | Taipale | H05B 47/18 315/200 R |
| 2014/0273811 | A1* | 9/2014 | Czapla | H05B 47/19 455/3.06 |
| 2015/0015716 | A1* | 1/2015 | Reed | G08B 13/19639 348/155 |
| 2015/0156031 | A1 | 6/2015 | Fadell et al. | |
| 2015/0160636 | A1 | 6/2015 | McCarthy, III et al. | |
| 2015/0174000 | A1* | 6/2015 | Barasch | A61H 19/00 600/38 |
| 2015/0208490 | A1* | 7/2015 | Bishop | G08C 17/02 315/153 |
| 2016/0261425 | A1* | 9/2016 | Horton | G05D 23/1917 |
| 2017/0223807 | A1* | 8/2017 | Recker | H02J 7/34 |
| 2017/0265268 | A1* | 9/2017 | Couch | H04W 4/06 |
| 2018/0042083 | A1* | 2/2018 | Couch | H05B 45/58 |
| 2018/0132340 | A1* | 5/2018 | Correa | B60Q 1/085 |
| 2019/0056498 | A1* | 2/2019 | Sonn | G01S 17/18 |
| 2019/0132055 | A1* | 5/2019 | Deixler | H04B 10/116 |
| 2019/0344966 | A1* | 11/2019 | Ishii | B65G 1/137 |

FOREIGN PATENT DOCUMENTS

| | | |
|---|---|---|
| WO | 2016/057761 A2 | 4/2016 |
| WO | 2017/207333 A1 | 12/2017 |
| WO | 2017/207339 A1 | 12/2017 |

OTHER PUBLICATIONS

United Kingdom Intellectual Property Office. Combined Search and Examination Reports under Section 17 and 18(3). Application No. GB1713299.4, dated Feb. 19, 2018, 9 pages.

* cited by examiner

US 10,813,198 B2

AUTOMATED CONTROL METHOD AND APPARATUS

FIELD OF THE INVENTION

The present invention relates to environmental control. More particularly, the present invention relates to automatically controlling appliances, in particular lighting devices, at a premises in an automated mode, which may be set, for example, when the premises is unoccupied.

BACKGROUND OF THE INVENTION

Timers are sometimes used to control appliances, such as lights and radios, while a premises is unoccupied, for example if the people living/working there are away for an extended period of time, such as a few days or weeks, e.g. on holiday. One idea behind controlling appliances to switch on and off when the user/occupier is not present is to try to emulate a user's normal behaviour to try to make it less obvious that there is no one in the premises. This can be useful in preventing intruders, who may monitor a premises and attempt burglaries during periods of non-occupation.

The present application provides an improved method and apparatus for automatically controlling lighting devices, e.g. when a user is not at a premises.

SUMMARY OF THE INVENTION

Aspects of the invention are set out in the independent claims and preferred features are set out in the dependent claims.

There is described herein an automated method of controlling a lighting system including at least two lighting devices, the method comprising the steps of: determining a set of lighting devices to be controlled in an automated mode; determining a start reference time and an end reference time; determining that one or more criteria for operating in the automated mode are met; selecting, from deactivated lighting devices of the set of lighting devices, a lighting device to be the first activated lighting device; activating the first activated lighting device during a pre-determined time period defined relative to the start reference time; selecting, from activated lighting devices of the set of lighting devices, a lighting device to be the first deactivated lighting device; and deactivating the first deactivated lighting device during a pre-determined time period defined relative to the end reference time.

By selecting lights to activate in predetermined time periods, or time slots, which are defined relative to start and end reference times, it may be possible to provide a system which mimics, or emulates, a user's behaviour effectively, while reducing setup complexity. For example, a user may simply have to select a reference time window (having start and end reference times) in which lights should be automated/controlled, and the lights that should be automated; the details of the implementation of activating the lights can then be determined when the system is in automated mode. This method has advantages over, for example, using timers for lighting devices to emulate user behaviour. In order to emulate user behaviour effectively, timers may be time-consuming to set, particularly where the intention is to activate multiple lights. Timers also provide regimented times or easily predictable times, which may make it less believable that the premises or property is occupied.

The time window between the start reference time and the end reference time is generally large compared to the length of the predetermined time periods. Thus it may be possible to activate, or switch on, lights near the start of the window during which devices are to be activated and deactivate lights near the end of that window. By providing a time period for activating/deactivating the lights, the switch on/off times may be less regimented/predictable and thus better emulate user behaviour. The predetermined time periods may be before or after the start and/or end reference times, preferably directly before or directly after, for example so the start or end of the predetermined time period coincides with the start or end reference time. In some embodiments the predetermined time periods encompass the start/end reference time, e.g. the reference time falls in/near the middle of the time period. In one example the pre-determined time period defined relative to the start reference time begins at the start reference time and the pre-determined time period defined relative to the end reference time ends at the end reference time; thus lights may be automatically activated only during the time window between the start and end reference time and deactivated before the end reference time.

Each of the at least two lighting devices may be a light source, e.g. a light bulb, or luminaire. The lighting devices may be suitable for providing illumination of a space (e.g. as opposed to an indicator LED). The lighting devices may be "smart" devices such that they can be controlled automatically, e.g. by a local controller at a premises. Such smart devices could be e.g. a smart light bulb or a smart light switch. The time window between the start reference time and the end reference time is generally less than a day, for example the reference time window may comprise a part of a day.

Preferably, the first activated lighting device is activated at a first activation time; and the method further comprises: selecting, from deactivated lighting devices of the set of lighting devices, one or more further devices to be further activated devices; and activating said one or more further activated devices during a further activation time period defined relative to the first activation time. Normally the further activated devices will not include the first activated device; for example, the first activated device may have been previously activated so could not be selected from the deactivated lighting devices. Generally the further activated devices comprise a plurality of (or more than one) further activated devices, each further activated device having a corresponding activation time within the further activation time period defined relative to the first activation time. These further activation times may be independent of one another, so usually the further activation times will be different from each other, or distinct. The further activated devices may comprise or consist of all of the devices in the set of lighting devices, except for the first activated device. The further activation time period may follow the first activation time, for example it may be directly after, e.g. so that it commences at the first deactivation time.

Preferably, the first deactivated lighting device is deactivated at a first deactivation time; and the method further comprises: selecting, from activated lighting devices of the set of lighting devices, one or more further devices to deactivate; and deactivating said one or more further devices to deactivate during a further deactivation time period defined relative to the first deactivation time. Generally the further devices to deactivate do not include the first deactivated device. Generally the further deactivated devices comprise a plurality of (or more than one) further deactivated devices, each further deactivated device having a corresponding deactivation time within the further deactivation time period defined relative to the first deactivation time. These further deactivation times may be independent of one another, so usually the further deactivation times will be different from each other, or distinct. The further deactivated devices may comprise or consist of all of the devices in the set of lighting devices, except for the first deactivated device. The further deactivation time period may follow the first deactivation time, for example it may be directly after, e.g. so that it commences at the first deactivation time.

In some embodiments, the step of activating the first activated lighting device comprises: selecting a first activation time in the pre-determined time period defined relative to the start reference time. The step of deactivating the first deactivated lighting device may comprise selecting a first deactivation time in the pre-determined time period defined relative to the end reference time. The step of activating said one or more further activated devices during a further activation time period defined relative to the first activation time may comprise selecting an activation time for each of the one or more further activated appliances in the further activation time period defined relative to the first activation time. The step of deactivating said one or more further deactivated devices during a further deactivation time period defined relative to the first deactivation time can comprise selecting a deactivation time for each of the one or more further deactivated appliances in the further deactivation time period defined relative to the first deactivation time. In preferred embodiments these selections of times may be made randomly, to give a random time within the time period. The selections of times may be independent of one another.

Thus each time the start reference time is reached (e.g. on subsequent days) when the system is in the automated mode the devices may be switched on in a different order, so appear less predictable. Preferably one lighting device is switched on at each time, e.g. such that there is a one-to-one mapping between lighting devices and activation times.

In some embodiments, the further activation time period defined relative to the first activation time is a time period of pre-determined length following the first activation time, preferably immediately following the first activation time; and/or the further deactivation time period defined relative to the first deactivation time is a time period of pre-determined length following the first deactivation time, preferably immediately following the first deactivation time.

Preferably, the selection of the first deactivated lighting device is independent of the selection of the first activated lighting device; and/or the selection of the further deactivated lighting devices is independent of the selection of the further activated lighting devices. The selection of all devices may be completely independent of one another, in particular, a first activated device does not need to, but may, correspond to the first deactivated device.

Preferably, one or more of the following selections is performed randomly to select a random time or a random lighting device: selecting a first activation time; selecting one of the set of lighting devices to be the first activated lighting device; selecting a first de-activation time; and selecting one of the set of lighting devices to be the first de-activated lighting device. The further activated or deactivated devices may also be randomly selected. Thus the sequence of lights which are switched on may be different, and in particular randomly different, for activation periods on subsequent occasions.

Preferably the pre-determined time period defined relative to the start reference time is a time period of a pre-determined length following the start reference time, preferably immediately following the start reference time. Preferably, the pre-determined time period around the end reference time is a time period of a pre-determined length preceding the end reference time, preferably immediately preceding the end reference time.

Preferably, determining the set of lighting devices to be controlled comprises selecting the set of lighting devices from a plurality of lighting devices located at a premises. A lighting device may be a lightbulb, light source or luminaire, e.g. which is suitable for providing illumination of a space. In some embodiments a lighting device is an LED (Light Emitting Diode).

Preferably, the pre-determined time period defined relative to the start reference time begins at the start reference time and/or wherein the pre-determined time period defined relative to the end reference time finishes at the end time. For example, the periods are immediately or directly before/after the start/end reference times. The pre-determined periods are generally short compared to the difference between the start and end time.

For example, one or more of: the pre-determined time period defined relative to the start reference time; the pre-determined time period defined relative to the end reference time; the further activation time period defined relative to the first activation time; and the further deactivation time period defined relative to the first deactivation time; are at least 5 minutes, preferably at least 10 minutes, more preferably at least 20 minutes, preferably around 30 minutes. Equally, one or more of: the pre-determined time period defined relative to the start reference time; the pre-determined time period defined relative to the end reference time of the activation period; the further activation time period defined relative to the first activation time; and the further deactivation time period defined relative to the first deactivation time; may be less than 120 minutes, preferably less than 60 minutes, more preferably less than 40 minutes. The further activation slot or period times may be 5 minutes or greater, or 10 minutes or greater, and/or 40 minutes or less, or 30 minutes or less, or 20 minutes or less, preferably around 15 minutes. In some embodiments the further (de)activation period is shorter than the initial activation slot (or the (de)activation time period defined relative to the first activation time).

Preferably, the step of determining the start reference time and end reference time comprises: receiving an input from a user indicative of a start and/or end reference time.

Optionally, the step of determining the start reference time and end reference time further comprises: presenting the user with one or more selectable options for the start and/or end reference time; and wherein receiving an input from a user indicative of a start and/or end reference time comprises: receiving an input indicative of the user selecting one of the one or more selectable options for the start reference time and/or end reference time. For example these may be provided to a user on a user interface of a user device, such as a screen or mobile telephone or tablet. The options may be provided to the user via an app.

Preferably, the step of presenting the user with one or more selectable options for the start and/or end reference time comprises: displaying the one or more selectable options on a user-interface of a device, such as a thermostat, smartphone, tablet or the like.

Preferably, the method further comprises, prior to presenting the user with one or more selectable options for the start and/or end reference time, determining the one or more selectable options based on one or more of: previous user behaviour, such as previous user-initiated activation times for lighting devices; and a predictable environmental condition, such as the time of sunrise, sunset, hours of daylight or hours of darkness. For example, the options may be based on what times the user activated or deactivated devices in the set of lighting devices during occupied periods between start and end reference times. This may only be possible when the set of devices is selected or determined prior to the start and end reference times being selected/determined. For example, a start reference time option may comprise an average (e.g. mean or median) time at which devices in the set of devices are activated and/or the end reference time option may comprise an average (e.g. mean or median) time at which devices in the set of devices are deactivated. The environmental condition may be one that varies according to the time of year or the geolocation of premises (e.g. sunrise/sunset or daylight hours). The hours of daylight and hours of darkness may also be known as lighting up or lighting down time.

In some embodiments, the start reference time and/or end reference time are determined based on one or more of: previous user behaviour (as set out above in relation to selecting the options), such as previous user-initiated activation times for lighting devices; a predictable environmental condition, such as the time of sunrise, sunset, hours of daylight or hours of darkness. For example, the start/end reference times may be set automatically using this information, e.g. user input may not be required.

Preferably, the step of determining the set of lighting devices to be controlled in an automated mode comprises: receiving an input from a user indicative of the set of lighting devices to be controlled.

Preferably, the step of determining the set of lighting devices to be controlled in an automated mode further comprises: presenting the user with one or more selectable options indicative of controllable lighting devices at a premises; and wherein receiving an input from a user indicative of the set of lighting devices to be controlled comprises: receiving an input indicative of the user selecting one of the one or more selectable options (normally more than one, e.g. one option being selected for each device in the set).

Preferably, the step of presenting the user with one or more selectable options indicative of the controllable lighting devices at the premises comprises: displaying the one or more selectable options on a user-interface of a device, such as a thermostat, smartphone, tablet or the like.

Optionally, the method further comprises, prior to presenting the user with one or more selectable options indicative of the lighting devices to be controlled: determining the one or more selectable options based on previous user behaviour, such as lighting devices that were previously activated by a user during periods of occupation of the premises. The options may e.g. be based on which devices the user activated during periods corresponding to the window between the start and end reference times, e.g. between those times on previous days. The previous behaviour may be behaviour over a set time period, e.g. the past week, the past month or the past year, or it may be behaviour over all time for which data is held. The options may be based on the most frequently activated devices and/or the devices that have been activated for the longest time periods, preferably looking at the frequency or length of activation periods between the start and end reference times. This may depend on the start and end reference times being selected/determined before the set of devices to be controlled.

Preferably, determining the set of lighting devices to be controlled is based on previous user behaviour, such as user-initiated activation of lighting devices during periods of occupation of the premises. For example, the set of devices may be determined automatically based on previous behaviour without presenting options to a user.

Preferably, determining that one or more criteria for operating in the automated mode are met comprises: receiving a user input indicating that the premises is unoccupied and/or setting the mode of the control system to an automated or unoccupied mode. For example such user input may be received from an app on smartphone or tablet or user interface on a computer, or from a user interface in the premises, e.g. a controller or thermostat or other display. Unoccupied may refer to there being no human user at the premises.

Preferably, determining that one or more criteria for operating in the automated mode are met comprises: determining that user-initiated control of appliances at the premises has not occurred for a pre-determined time period; or determining that a mobile device associated with a user is not present at the premises, e.g. by determining it is not connected to a local (wireless) network at the premises, and/or that a mobile device associated with a user is more than a pre-determined distance from the premises, e.g. by geolocation tracking. Determining whether a user or occupier is present at the premises may be based on output from an occupancy sensor, such as a motion or light sensor. The predetermined time period may be e.g. 24 hours, or 48 hours.

The appliances which are monitored to determine whether user-initiated control has occurred may be lighting devices and/or may be other types of appliances, e.g. a fan; a heating system; a television; a radio; a sound system; a user entertainment system.

In some embodiments, determining that one or more criteria for operating in the automated mode are met further comprises: sending a message to a device associated with the user, wherein the message contains a user-selectable option that indicates the premises is unoccupied and/or that the automated mode should be initiated; and detecting that the user has selected the option that indicates the premises is unoccupied and/or that the automated mode should be initiated.

Generally, activating or deactivating appliance lighting device comprises: sending a control message or command to the lighting device. Such sending may be by way of wired or wireless connection e.g. a WLAN such as Wi-Fi or Zigbee. The control message may be sent by a local controller at the premises.

There is also described a computer-readable medium comprising software code adapted, when executed on a data processing apparatus, to perform a method as set out above.

There is also described herein a controller for controlling a lighting system including at least two lighting devices in an automated mode, the controller having: a memory for storing information relating to the at least two lighting devices; a communications interface for communicating with the at least two lighting devices; and a processor operable to: determine a set of lighting devices to be controlled in an automated mode; determine a start reference time and an end reference; determine that one or more criteria for operating in the automated mode are met; select, from deactivated lighting devices of the set of lighting devices, a lighting device to be the first activated lighting device; activate the first activated lighting device during a pre-determined time period relative to the start reference time; select, from activated lighting devices of the set of lighting devices, a lighting device to be the first deactivated lighting device; and deactivate the first deactivated lighting device during a pre-determined time period defined relative to the end reference time.

There is also described a lighting system for a premises, the lighting system comprising: at least two lighting devices; and a controller as described above.

In some embodiments, other devices than lighting devices, such as sound systems or other appliances, may be included in the set of devices to be controlled in an automated mode.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Embodiments will now be described, by way of example only and with reference to the accompanying drawings, in which.

DETAILED DESCRIPTION OF THE INVENTION

An environmental control system may comprise a plurality of appliances, such as lights, radios, sound systems. The system may also comprise dishwashers, washing machines, boilers and other heating, ventilation or air conditioning equipment or devices. The environmental control system allows automatic control of the appliances or devices. For example, a user can select a schedule for the appliances and the appliances may be controlled according to that schedule. A thermostat or hub is used to store control information and send control commands to the appliances.

Figure 1A:
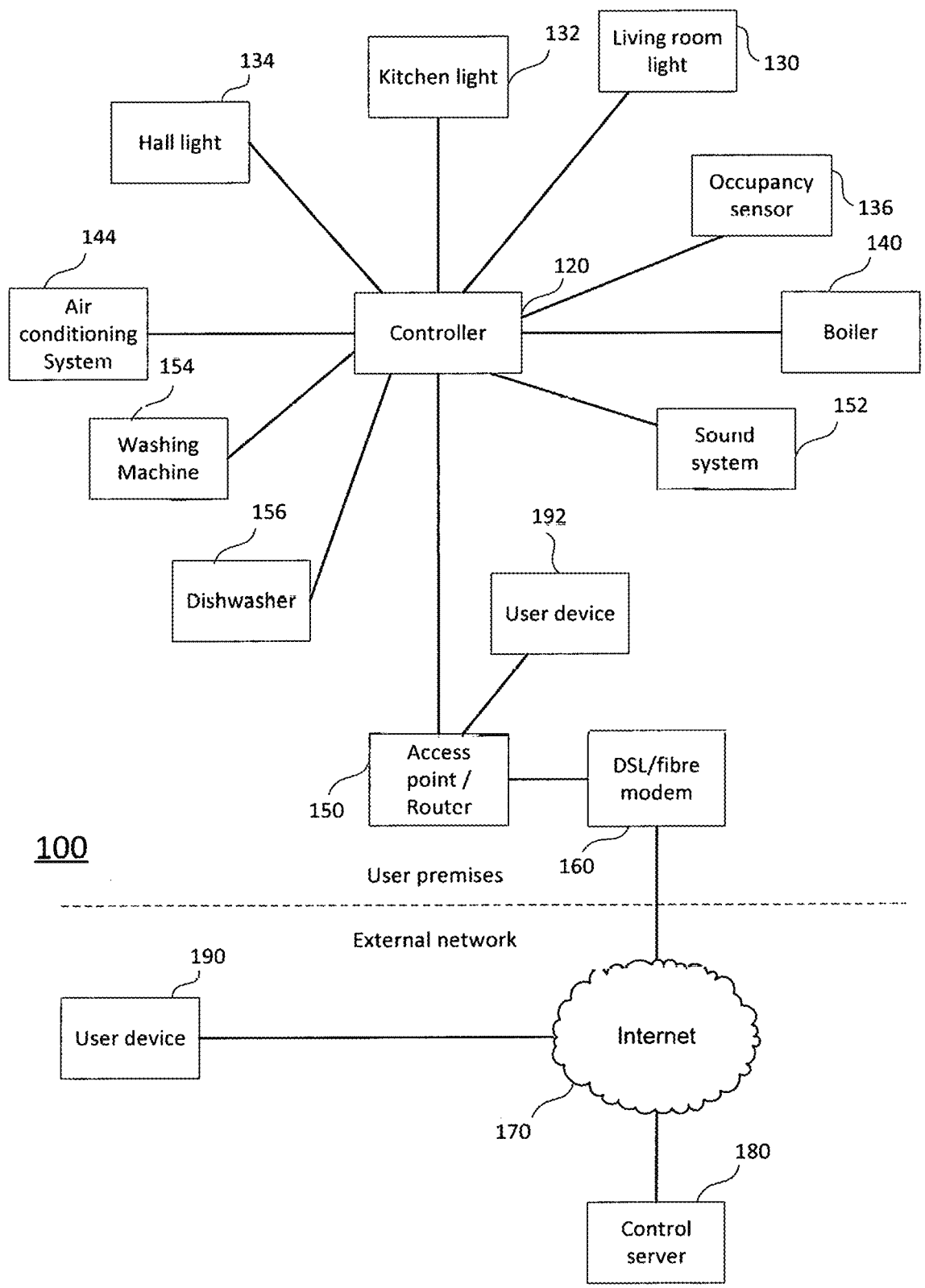
FIG. 1A illustrates a system diagram of an exemplary environmental control system including a lighting system.

FIG. 1A illustrates a system diagram of an exemplary environmental control system 100. The environmental control system 100 includes a controller 120. The controller 120 may be, for example, a home control hub or a smart thermostat into which a user can program a heating, hot water, lighting or other environmental control schedule; additionally or alternatively the user may be able to control devices or appliances remotely via the controller 120, e.g. via an app on a smartphone or tablet. The controller 120 is connected to several appliances, or devices, including to a living room light 130, a kitchen light 132, a hall light 134, a central heating/hot water boiler 140 and an air conditioning system 144. The lights 130, 132, 134 may be "smart" lights, e.g. having smart bulbs and/or smart light switches such that they can be controlled automatically. The boiler 140 may, for example, be a conventional gas boiler arranged to provide a supply of heated water to a series of radiators in the user's premises and to a hot water tank for onward supply to hot water taps. The controller 120, living room light 130, kitchen light 132 and hall light 134 may together make up a lighting system.

There are also provided further appliances, including a sound system 152, a washing machine 154 and a dishwasher 156 at the user premises, which are also connected and controllable by the controller 120. A user can program a washing schedule, such as to activate the washing machine 154 and/or dishwasher 156. Alternatively, or additionally, a user may be able to activate the washing machine 154 or dishwasher 156 remotely, e.g. via an application on a mobile device which allows communication via the access point 150. The sound system 152 may include one or more speakers throughout the premises. The controller 120 may be able to send commands to control the sound system 152, for example to adjust the volume, switch the system 152 on/off or to control what content/media is played via the speakers.

The system 100 also includes an occupancy sensor 136, which can communicate with the controller 120. The occupancy sensor 136 may be a motion or light sensor which can detect whether a user is present at the premises.

The appliances may be connected to the controller 120 via wired connections or wirelessly, e.g. via a Wi-Fi® 802.11 or Zigbee® network.

The controller 120 is connected to the user's local network/internet access infrastructure, for example, to a wireless or wired home router/access point 150, which in turn provides access to the Internet 170 through a modem 160, such as an ADSL or fibre modem. The connection between the controller 120, devices/appliances and access point 150 may be via a short-range wireless network, such as ZigBee® 802.15.4 or Wi-Fi® 802.11. Depending on access technology, router 150 and modem 160 may be combined in a single device or replaced with other access devices appropriate to the access technology.

Although specific components 130, 132, 134, 136, 140, 144, 152, 154, 156 are shown, in some embodiments only one or two such appliances or devices may be provided, whilst in other embodiments there may be more and/or different appliances.

The controller 120 can send control and/or schedule information to appliances, for example to activate/deactivate appliances, e.g. to switch them on or off, or to change operating parameters, e.g. to dim or brighten lights or increase or decrease temperature or volume settings (as appropriate). For example the user can program a schedule for hot water at the controller 120, and the controller 120 can then send the hot water schedule to the boiler 140. The user may program a lighting schedule to switch specific lights on during times the user is likely to be at the premises and/or to switch lights off when they are not at the premises.

The user may also interact with the devices/appliances at the premises from a user device 190 located outside the user's premises on an external network and connected to the Internet 170. In some embodiments a user device 192 is located at the user premises and can be connected wirelessly (or by wired connections) to the user's local network, e.g. as shown the user device 192 can be in wireless communication with the access point 150. User devices 190, 192 may take the form of smartphones, tablet computers, personal computers, and the like. User devices may include an application for controlling appliances, or other electronic or smart devices, at the premises. The application may then send information to the controller 120 (e.g. to update a schedule or to switch on/off or activate/deactivate an appliance).

The controller 120 may send control information to a remote datacentre, such as the remote server 180, on an external network, e.g. via its connection to the Internet 170. The remote server 180 can log this information and store it for analysis. The remote server 180 may also host a web application and/or a control database and may be able to send commands to the controller 120, for example to activate or de-activate an automatic mode, e.g. an unoccupied or mimic mode, or to send specific commands to individual appliances or groups of appliances at the premises.

While this description has focused on the home environment, the invention can also be used in offices or other premises in which smart appliances are used.

Figure 1B:
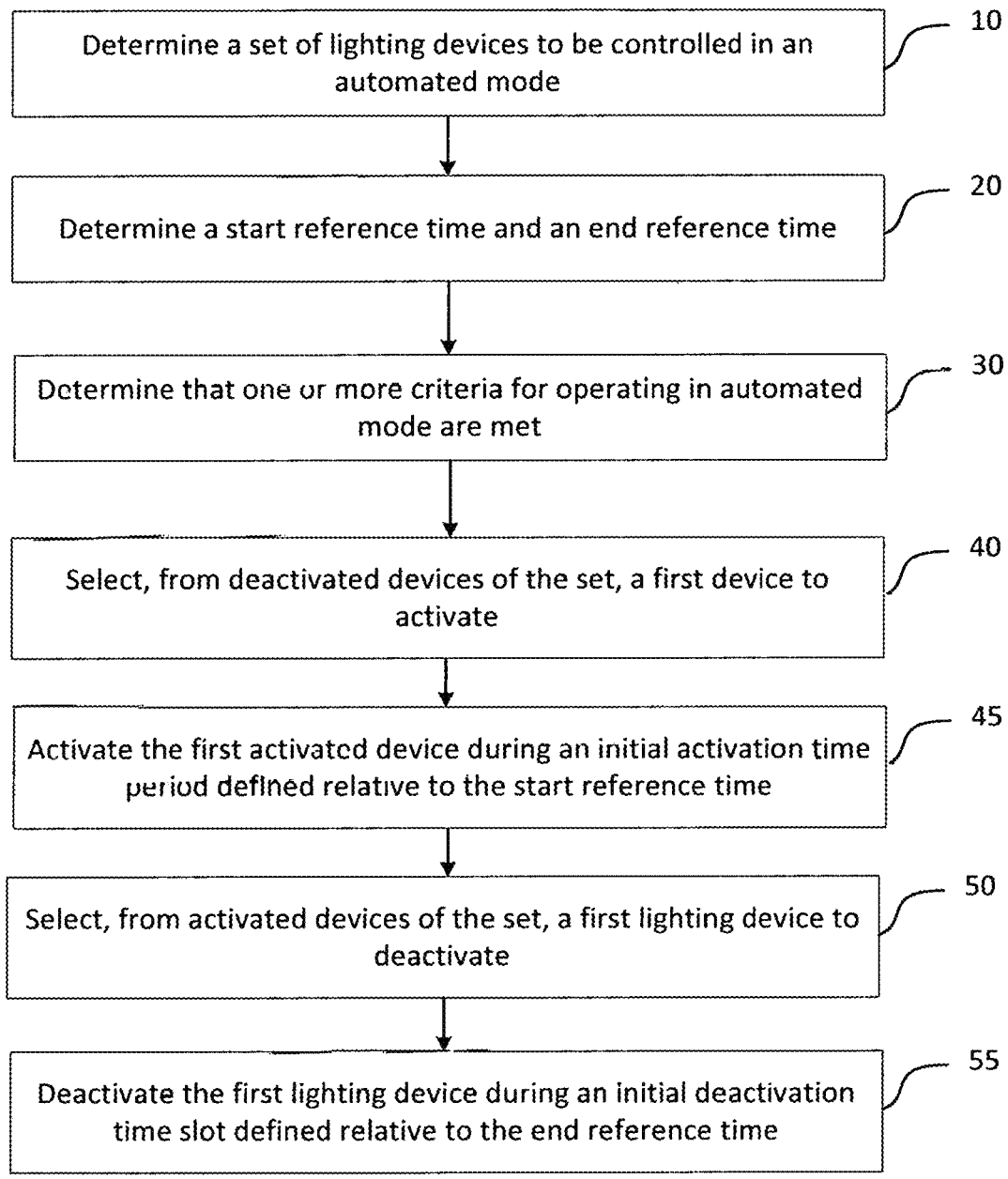
FIG. 1B illustrates an exemplary method for controlling automatically an environmental control system or lighting system.

Referring to FIG. 1B, an exemplary embodiment will now be described. FIG. 1B illustrates an exemplary method 1 for controlling automatically an environmental control system 100 or lighting system.

The method starts at step 10, in which one or more devices (normally lighting devices, but other controllable devices or appliances are also possible) to be activated during an automated mode, such as during unoccupied periods, are determined. These may be determined based on a user selection of devices, such as a selection of devices or appliances from all the controllable appliances in the control system, or a selection of appliances from a subset of the appliances in the control system, e.g. a relevant subset. The list of available or selectable devices, or the relevant subset thereof, may be presented to the user. In some cases these devices are presented or suggested to the user, e.g. via a user interface on a device, such as the controller or smartphone, e.g. in an app, and the user may be given an option of confirming that the suggested appliances should be activated or controlled during unoccupied periods or when the system is in an automated mode. The relevant subset of available appliances may be based on past use of the appliances. For example, appliances that the user frequently uses during a time window for which automation is required (e.g. daily, or more than a predetermined number of times in a given time period, such as a week, fortnight or month) or uses for a long period of time during the time window for which automation is required (e.g. more than a predetermined threshold, e.g. 1 hour, 2 hours or 4 hours) may be selected/determined as appliances to be activated.

The method 1 then progresses to step 20, where a start reference time and an end reference time are determined. The start and end reference times may define an activation period. The window between the start and end reference times is the period during which appliances (e.g. lighting devices) should be activated when in automated mode (commonly when the premises is unoccupied, or when an unoccupied mode is set or active). The start and end times may be pre-set, they may be selected by a user or they may be determined automatically, e.g. based on previous user behaviour and/or predictable environmental parameters such as daylight hours.

The start time and end time may comprise times of day, for example a period may run from 6 pm to 10 pm. Additionally the start time and end time may be dependent on the day, for example different start times and end times may be selected depending on the day of the week. In some embodiments the start time and end time may be dependent on the season or the time of year, for example where seasonal changes mean lighting up and lighting down times (or daylight hours) alter due to seasonal variation in the sunrise/sunset times.

At step 30, it is determined that one or more occupation criteria indicating automated mode is activated is satisfied, e.g. because the premises is unoccupied. For example, this may be determined by receiving an indication from a user that the premises is unoccupied and appliances should be controlled to emulate or mimic user behaviour. For example, the criteria may comprise the user having set or activated an "away" or "unoccupied" mode. Alternatively, or additionally, step 30 may comprise detecting whether the user has initiated any controls on appliances at the premises in a time period, e.g. around 24 hours, 36 hours, 48 hours, 72 hours etc. Thus the criterion may be that no active control of appliances is detected for a given time period. In some embodiments, the criteria may be based on the location of mobile devices, e.g. they may relate to whether any mobile devices are detected as being present at the premises, or whether they are detected as being more than a predetermined distance from the premises. The predetermined distance may be at least 20 miles, at least 50 miles, at least 100 miles or at least 500 miles. Such mobile devices may be associated with one or more (known) users of the premises. The location of the mobile devices may be determined by geolocation services and/or whether the mobile devices are connected to local wireless networks (e.g. Wi-Fi or Zigbee) at the premises.

At step 40, one of the lighting devices in the set to be controlled is selected as the first device to be activated. Such selection may be performed randomly, e.g. by the controller.

At step 45 the first device to be activated is activated during an initial activation time slot following, or around, the start reference time. The initial activation time slot is 30 minutes in length. In this case the initial activation time slot begins at the start time. The appliance is activated at a random time within that time slot.

At step 50, one of the lighting devices in the set which is activated is selected as the first device to be deactivated. The device that is selected at step 50 may be the same device that was chosen at step 40 as the first activated device, or may be another device from the set. This device may be randomly selected and/or may be selected independently of the first activated device that was activated during the initial activation time slot.

At step 55 the first deactivated lighting device is deactivated during an initial deactivation time slot around, or preceding, the end time of the activation period. This time slot is also 30 minutes. The end of the time slot coincides with the end time. The appliance is deactivated at a random time during the initial deactivation time slot.

In some embodiments step 20 is performed before step 10. In this case the start and end times may be used to determine which lighting devices are to be activated or controlled. For example, past or historic user behaviour may be used to determine which appliances or devices are to be activated, e.g. those appliances which the user normally activates between the start and end times may be selected or suggested.

In alternative embodiments, the initial activation time slot may precede or surround (or encompass) the start time, e.g. the start time may be positioned within the time slot or may be at the end of the time slot. Equally, in some embodiments, the initial deactivation time slot may follow or surround the end time.

Figure 2:
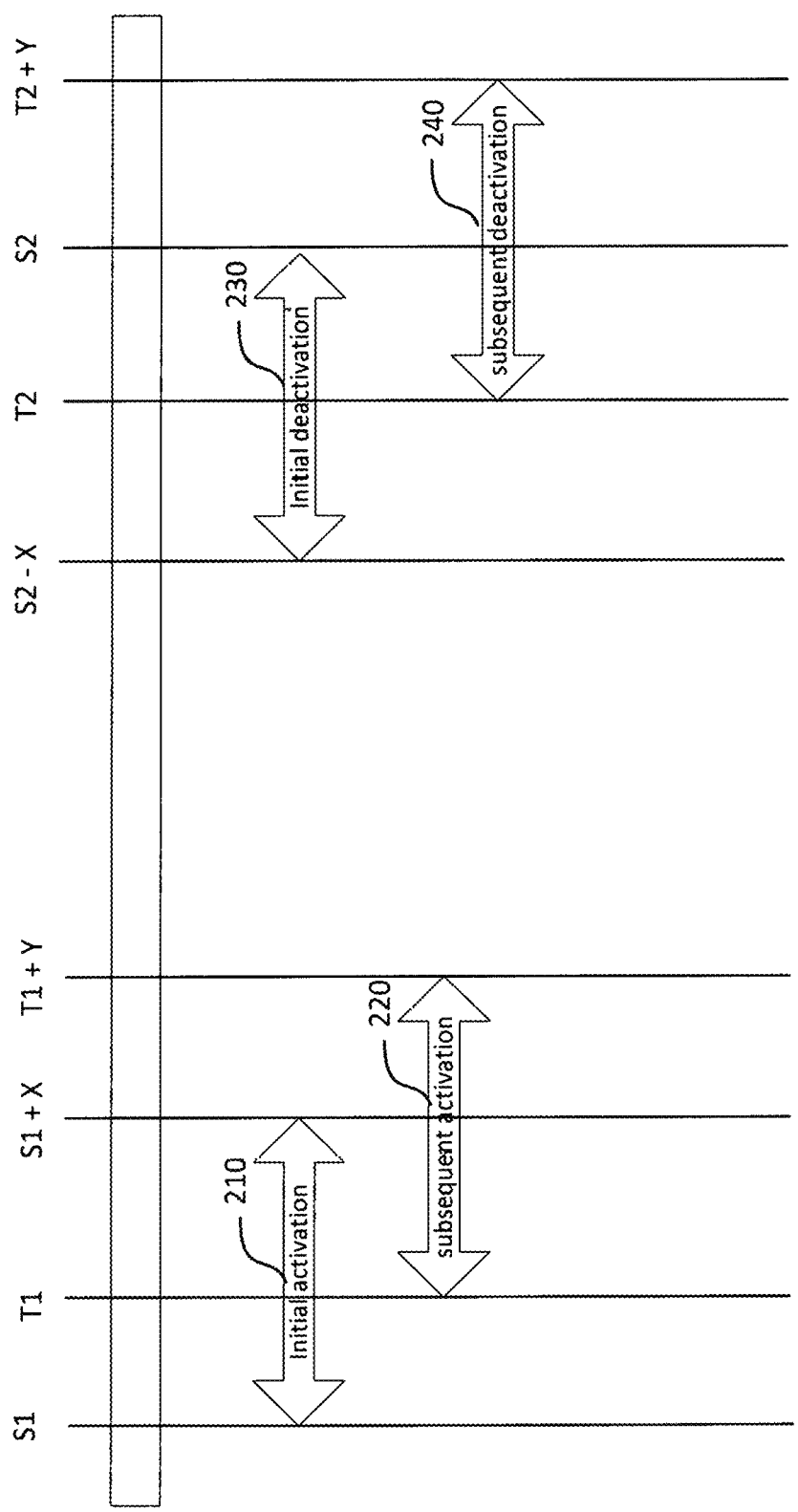
FIG. 2 shows a timeline of an exemplary activation period, or time window, during which appliances are to be controlled.

FIG. 2 shows a timeline of an exemplary activation period, or time window, during which devices are to be controlled. The time window starts at start reference time S1 and ends at an end reference time S2. Immediately following time S1 is an initial activation time slot or period 210 of length X (ending at time S1+X). Length X is around 30 minutes. A time within the initial activation time period for activating a lighting device to be activated first, such as a first light, is selected randomly as time T1. At time T1 the first activated device is activated.

The first activation time T1 initiates a subsequent activation time slot 220 of length Y, ending at time T1+Y. One or more (or all) of the remaining devices in the set to be activated/controlled are activated at random times in the subsequent activation time slot 220.

An initial deactivation time slot 230, also of length X, exists prior to the end time S2, beginning at time S2−X. A first deactivation time T2 is randomly selected within the initial deactivation period 230. One of the devices is deactivated at the first deactivation time T2. This may or may not be the same device that was activated first at time T1. Generally the first appliance to be activated and the first appliance to be deactivated will be selected randomly and independently of one another.

The first deactivation time T2 begins a subsequent deactivation period 240 of length Y, ending at T2+Y. The remaining devices that had been activated during the initial activation slot 210 and subsequent activation slot 220 are deactivated at random times in the subsequent deactivation time slot 240.

In one embodiment X is 30 minutes and Y is 15 minutes. In alternative embodiments the length of the initial deactivation time slot does not have to be the same as the length of the initial activation time slot. Equally, the subsequent deactivation time slot does not have to be the same length as that of the subsequent activation time slot. The length of the activation time slots will generally be shorter than the length of the activation period, preferably much shorter. The length of the time window for controlling the devices in the automated mode (S2−S1) is generally greater than 30 mins, preferably greater than 1 hour or 2 hours or 3 hours. The length of the time window (S2−S1) is generally shorter than 24 hours, preferably shorter than 12 hours, preferably shorter than 8 or 6 hours, preferably around 4 hours.

Figure 3:
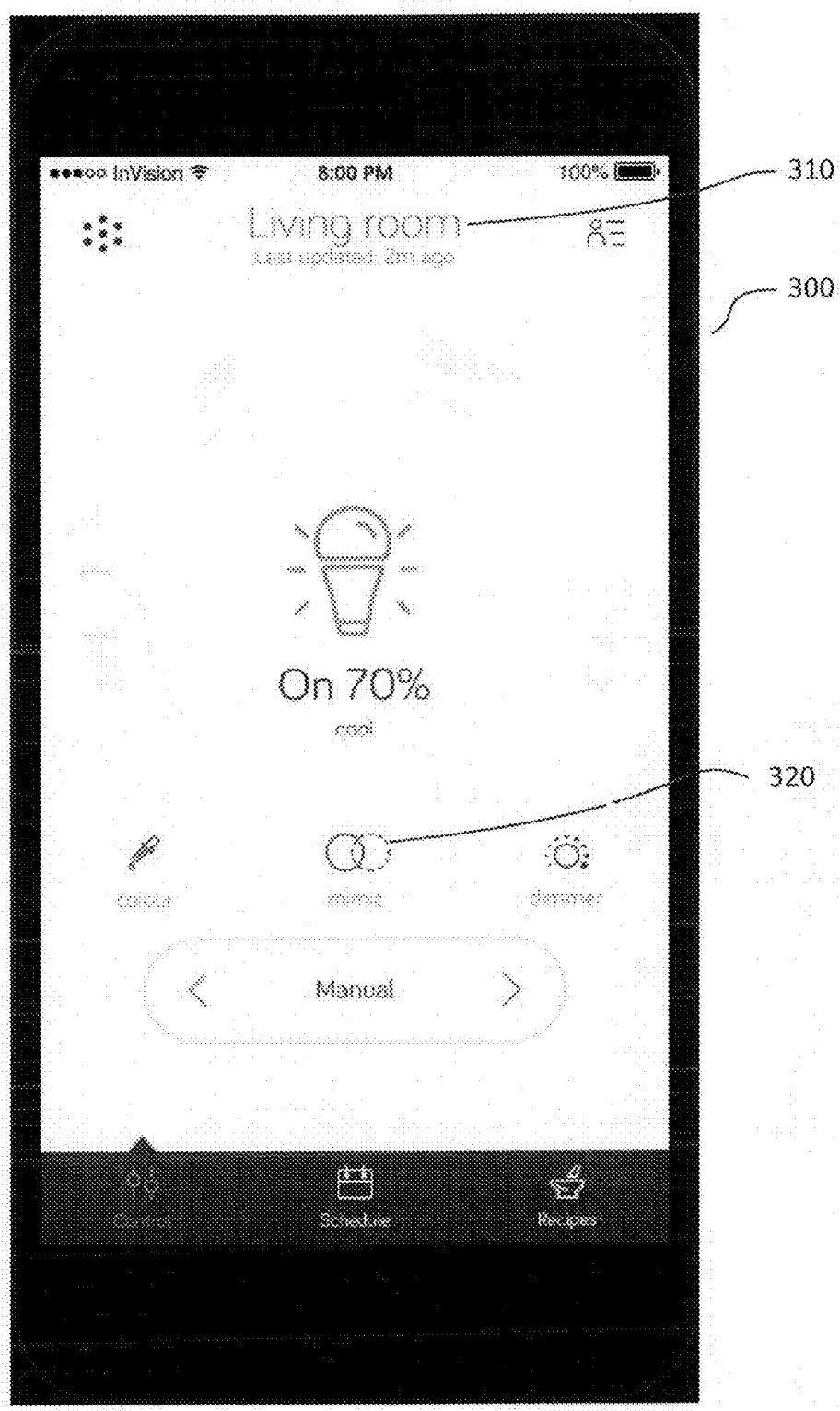
FIG. 3 shows a screen of an application for interacting, and in particular configuring, a lighting system for automatically controlling lighting devices.

FIG. 3 shows a screen of an application for interacting, and in particular configuring, a lighting system for automatically controlling lighting devices (or other appliances), e.g. during unoccupied periods. The user interface is on a touch screen of mobile user device 300. The interface comprises a lighting device identifying label 310 for the appliance to be controlled, in this case the living room light. The interface screen includes a button 320 for indicating that the device should be activated when the premises is unoccupied, here shown by the word "mimic". If the user selects mimic mode for this lighting device then the living room light will be one of the devices activated during in the automated mode, e.g. in unoccupied periods.

Figure 4:
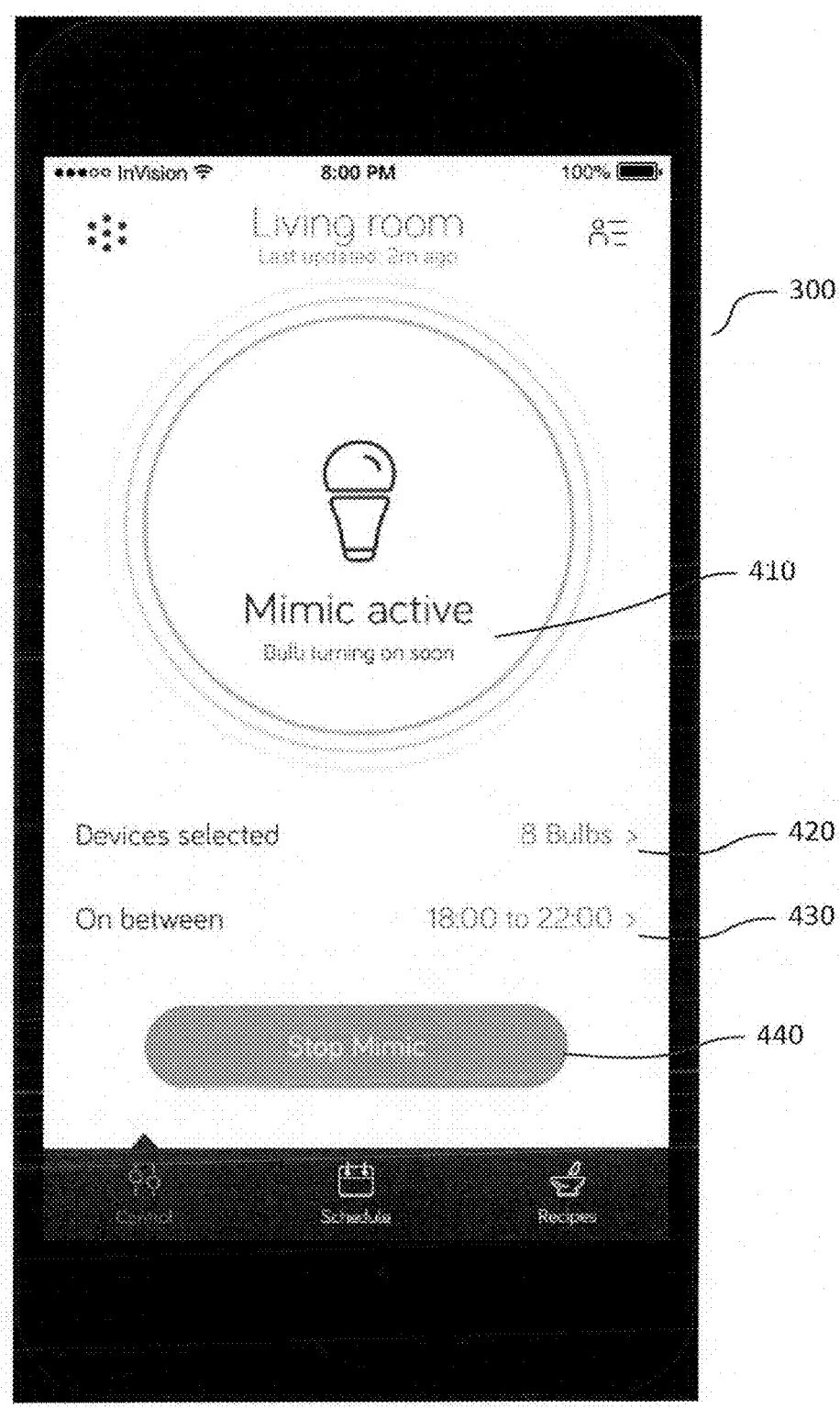
FIG. 4 shows another screen of an application for configuring control of a lighting system.

FIG. 4 shows another screen of an application for configuring lighting devices or other appliances to be controlled in an automated mode, such as when the user is not present, i.e. the premises is unoccupied. The screen is shown on mobile user device 300. The screen includes an indication 410 that mimic mode is active and that the living room bulb will be switched on soon. The screen also includes a label 420 showing how many appliances/devices are selected as appliances to be activated/controlled (in this case 8 lightbulbs) and a label 430 showing the start and end reference times (in this case 18:00 to 22:00). The screen also includes a button 440 to allow the user to disable or stop the mimic, or unoccupied, mode, e.g. if they return from holiday.

Figure 5:
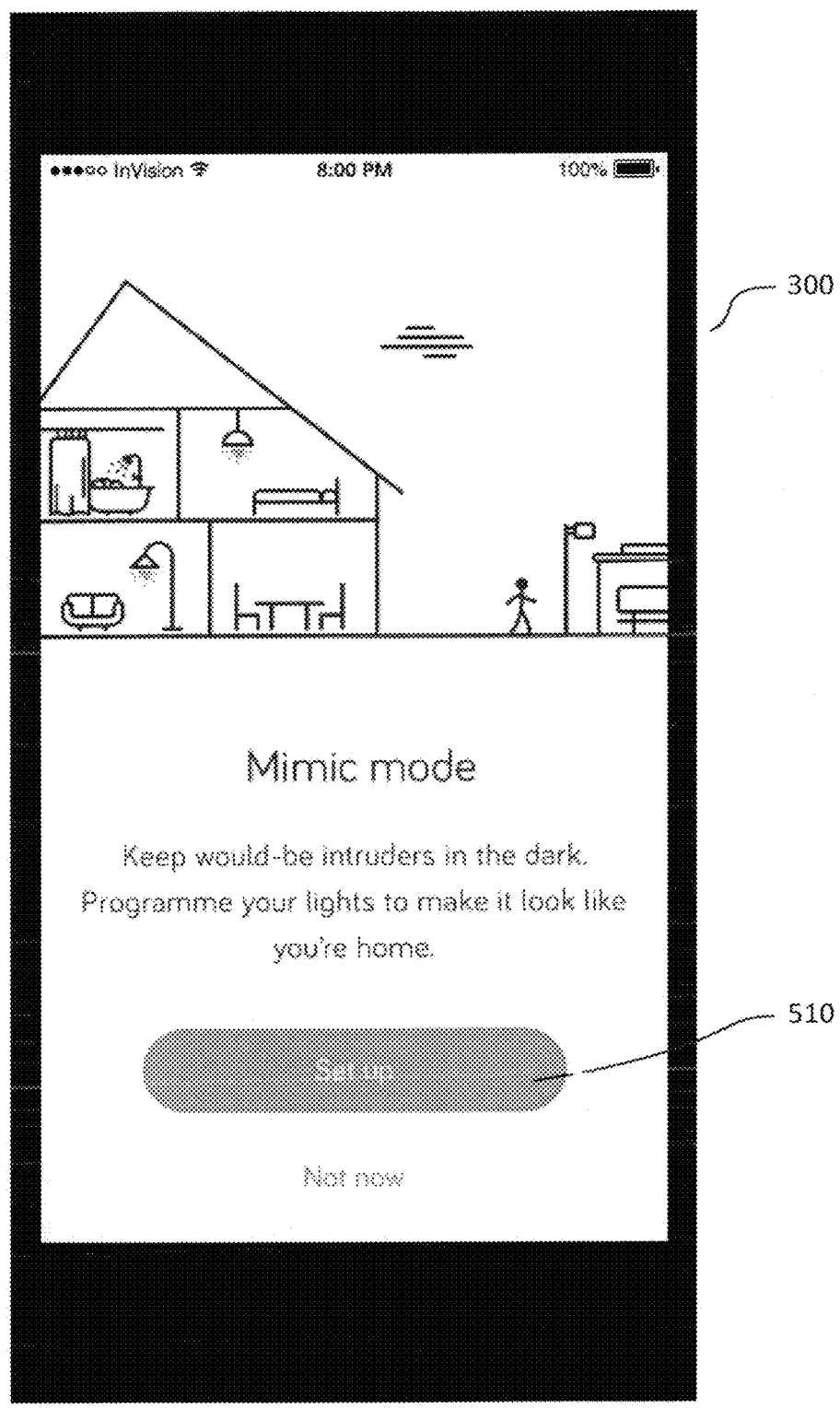
FIG. 5 shows a start screen of an exemplary application for the lighting system on a mobile user device.

FIG. 5 shows a start screen of the application on mobile user device 300. The start screen includes a set up button 510 which allows the user to begin the configuration process for the unoccupied or "mimic" mode.

Figure 6:
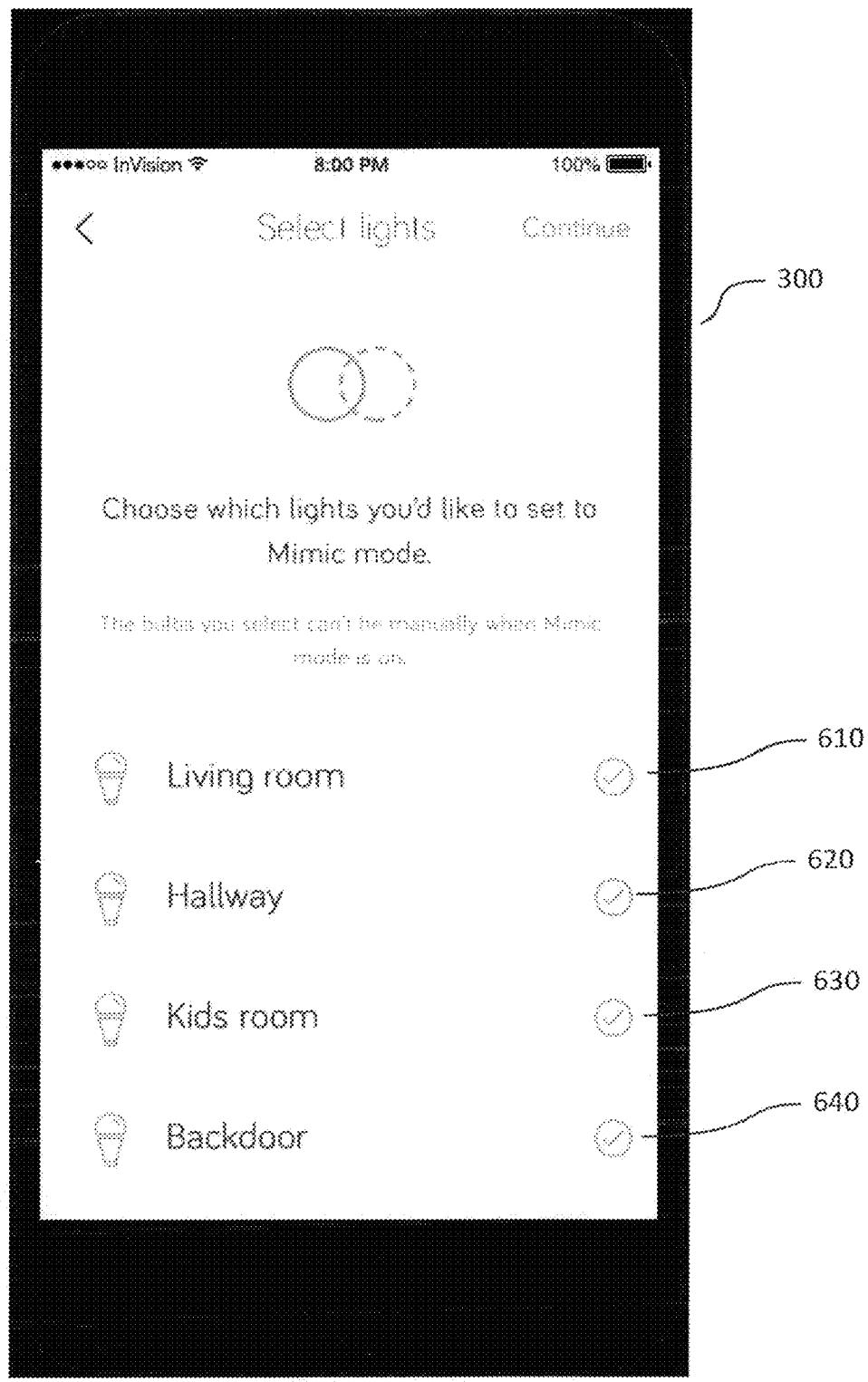
FIG. 6 shows a set up screen of an exemplary application for configuring the automated mode.

FIG. 6 shows a set up screen of the application for configuring the automated or unoccupied mode. The screen shows a set of options 610, 620, 630, 640 indicative of devices (lights) that are available to be controlled. Using these the user can select the one or more devices to be activated/controlled in automated or unoccupied mode.

Figure 7:
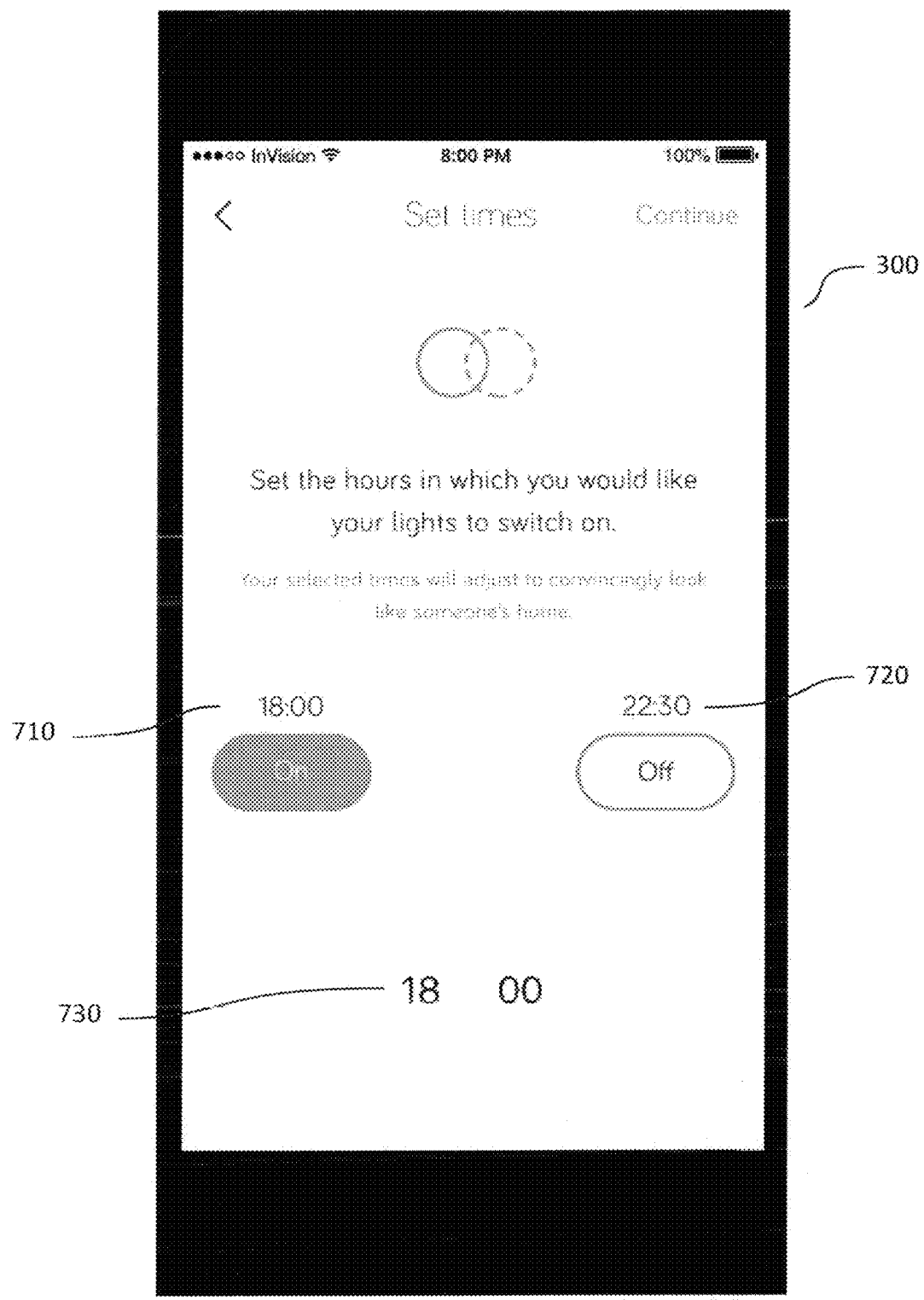
FIG. 7 shows another set up screen of an exemplary application for configuring the automated mode.

FIG. 7 shows another set up screen of the application for configuring the unoccupied mode. The screen shows an indication 710 of the start reference time (18:00) and an indication of the end reference time (22:30). The user can adjust the times by interacting with adjustable user input component 730.

Figure 8:
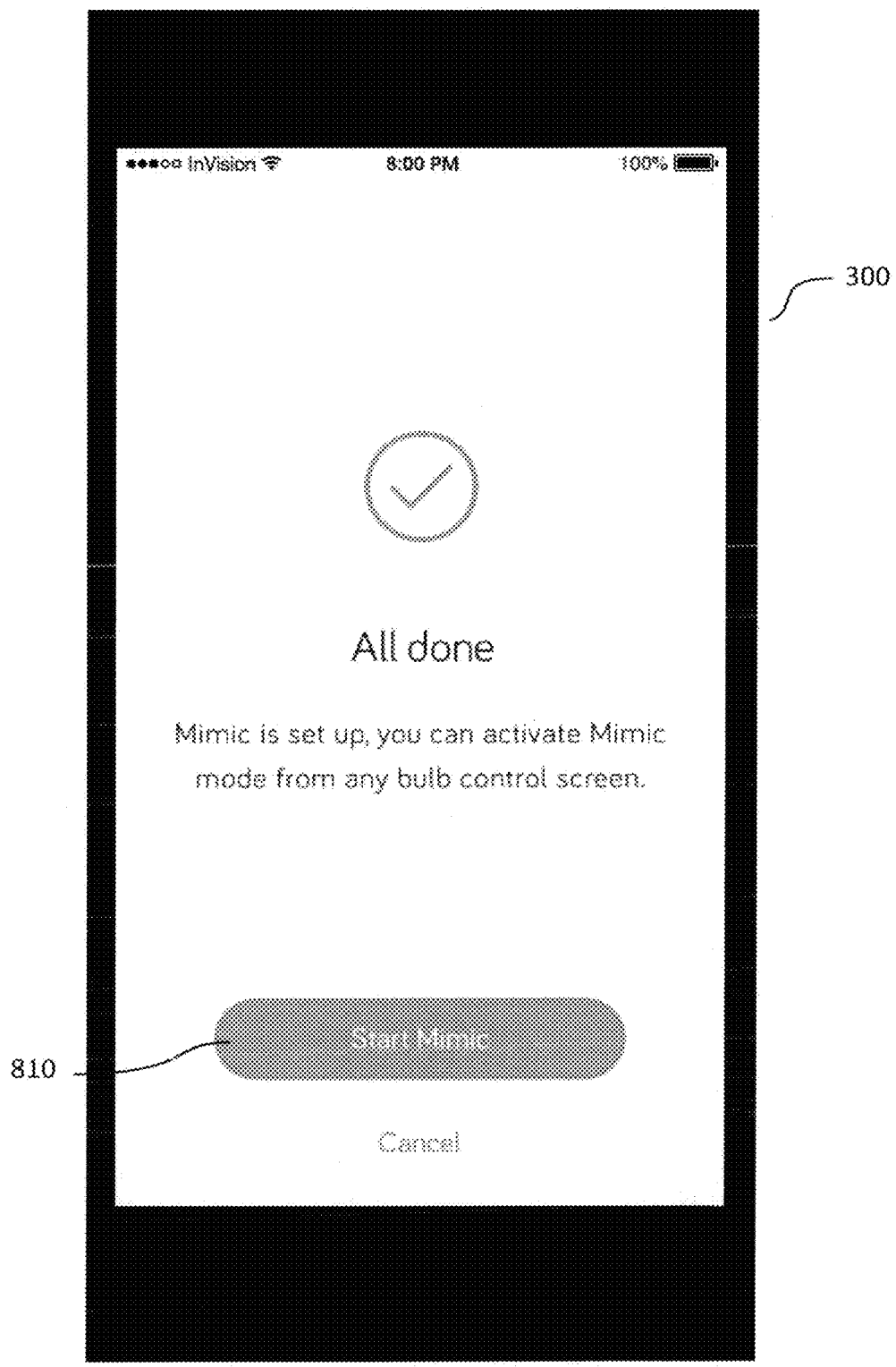
FIG. 8 shows a screen of an exemplary application, from which an automated mode can be activated or initiated.

FIG. 8 shows a screen of the application from which an automated, e.g. unoccupied or mimic, mode can be activated or initiated. The user can initiate mimic mode by selecting the start button 810.

Figure 9:
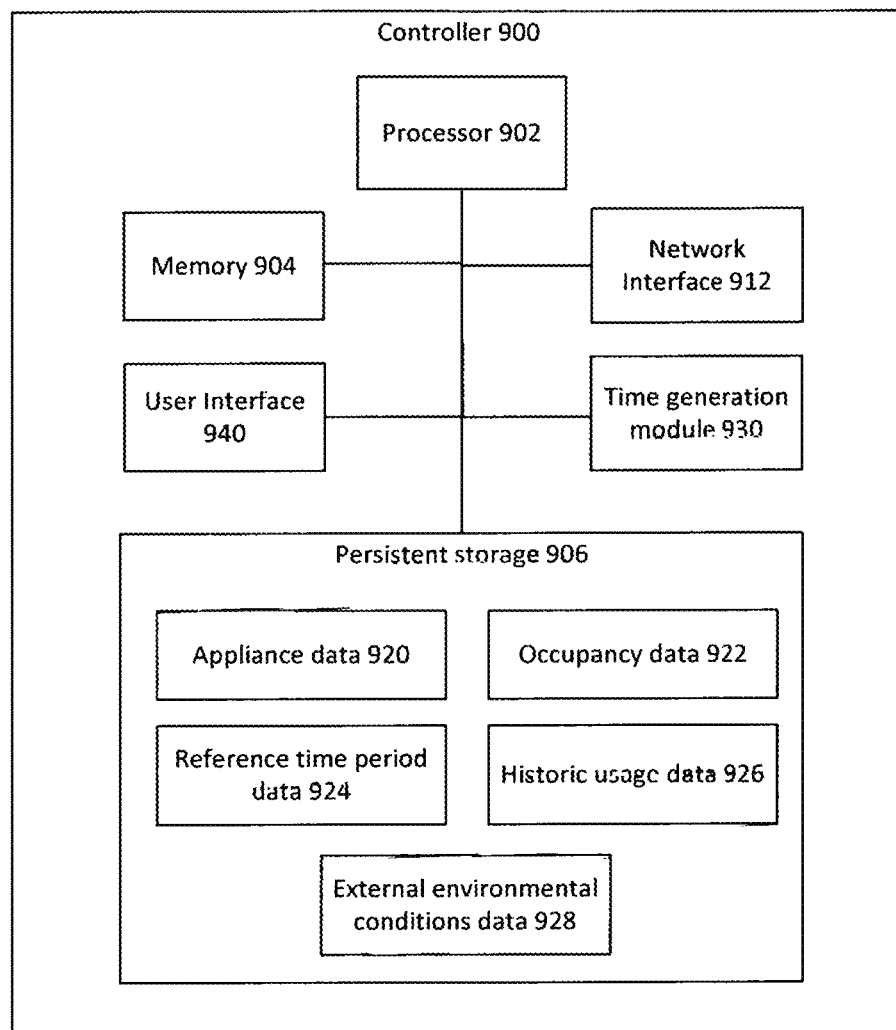
FIG. 9 illustrates a hardware architecture of an exemplary controller which is arranged to control devices automatically.

FIG. 9 illustrates a hardware architecture of an exemplary controller 900 which is arranged to control automatically devices or appliances, such as a lighting system comprising multiple lighting devices, e.g. while a premises is unoccupied, for example to mimic or emulate user behaviour, and may be used as the controller 120 of FIG. 1A. The controller 900 has a processor 902 and a volatile/random access memory 904 for storing temporary data and software code being executed. Random access memory 904 may be used to store, for example start and end reference times as they are received or otherwise determined (e.g. by calculation). Random access memory 904 may also store a selection of the set of devices to be controlled, for example at the stage when a user inputs which devices are to be activated/controlled during automated, or unoccupied, periods. Random access memory 904 may store the first activation time and first deactivation time once they have been selected, and may also store subsequent or further activation and deactivation times.

Persistent storage 906 stores appliance/device data 920, for example details of the devices that are available to be controlled at the premises, such as the type of device, the location of the device and/or a user identifier or label for the device. The appliance data 920 may include an indication of whether each device should be activated, or switched on, in automated mode, e.g. when the premises is unoccupied. Persistent storage 906 may also include occupancy data 922, for example an indication of whether the premises is currently occupied, or in an occupied or unoccupied mode, e.g. mimic or holiday mode.

Persistent storage 906 includes reference time period data 924, which may comprise start and end reference times. Reference time period data 924 may include different start/end times for different days, e.g. different days of the week may have different start/end times and/or different times of the year may have different start/end times, such as to take into account lighting up/lighting down times changing. Reference time period data 924 may also include the length of activation time slots or periods, such as the initial and subsequent time slots during which device activation and deactivation times are selected. The lengths of these time slots may be predetermined.

The persistent storage 906 also contains historic usage data 926 and external environmental conditions data 928, one or both of which may be used in determining which appliances are to be activated when the premises is unoccupied and/or what the start/end times of the activation period should be. The historic usage data 926 may include details of what times, frequencies and/or durations different appliances have been used when the premises is occupied. Once start and end times for an activation period have been selected or determined, the historic usage data 926 may be used to determine or suggest appliances which should be activated, for example appliances which are frequently used during the activation time period when a user is present at the premises. External environmental conditions data 928 may include, for example, details of daylight hours at the premises, e.g. sunrise/sunset and/or lighting up/lighting down times. Such data may include details of how these times change according to the season/time of year. External environmental conditions data 928 may include a geolocation position (e.g. a latitude or coordinates) for the premises, so that daylight hours data can be determined.

Persistent storage 906 may include other software and data, such as an operating system, device drivers, software configuration data, and the like.

The controller 900 has a time generation module 930 which may be used to generate or select activation and deactivation times for appliances. The time generation module 930 may select these times randomly within a specified time slot. Times may be selected independently of one another.

In some embodiments, the controller 900 includes a device selection module (not shown), which may select a device, e.g. randomly, to be activated or deactivated at a given time, for example at the first activation or deactivation time or at a subsequent or further activation time. Appliances/devices may be selected independently of one another.

The controller 900 has a user interface 940 for receiving user inputs. This may be e.g. a keyboard or a touch screen. Thus the user may be able to input which devices are to be activated during unoccupied periods and start and end reference times for the activation period. The user may also be able to set the mode, e.g. to an occupied mode or an unoccupied, or mimic, mode.

The controller 900 also has a network interface 912 for connecting to the appliances and devices at the premises. For example, network interface 912 may be a wireless interface for connecting via Wi-Fi and/or Zigbee.

The device components are interconnected by a data bus (this may in practice consist of several distinct buses such as a memory bus and I/O bus).

While a specific architecture is shown, any appropriate hardware/software architecture may be employed. For example, external communication may be via a wired network connection.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. An automated method of controlling a lighting system including at least two lighting devices, the method comprising the steps of:
   determining a set of lighting devices to be controlled in an automated mode;
   determining a start reference time and an end reference time;
   determining that one or more criteria for operating in the automated mode are met;
   selecting, from deactivated lighting devices of the set of lighting devices, a lighting device to be the first activated lighting device;
   activating the first activated lighting device during a first pre-determined time period, defined relative to the start reference time, and wherein the first activated lighting device is activated at a randomly selected first activation time during the first pre-determined time period;
   selecting, from the deactivated lighting devices of the set of lighting devices, one or more further devices to be further activated devices;
   randomly selecting an activation time during a further activation time period for each of the one or more further activated devices, wherein the further activation time period is defined relative to the randomly selected first activation time such that the further activation time period begins at or after the randomly selected first activation time and ends after Y minutes, where Y is a number greater than zero;
   activating all of the said one or more further activated devices at said selected activation time(s) during the further activation period;
   selecting, from activated lighting devices of the set of lighting devices, a lighting device to be the first deactivated lighting device; and
   deactivating the first deactivated lighting device during a second pre-determined time period, defined relative to the end reference time, and wherein the first pre-determined time period and the second pre-determined time period are non-overlapping in time, and wherein the further activation time period and the second pre-determined time period are non-overlapping in time.

2. A method according to claim 1, wherein the first deactivated lighting device is deactivated at a first deactivation time; and further comprising:
   selecting, from activated lighting devices of the set of lighting devices, one or more further devices to deactivate; and
   deactivating said one or more further devices to deactivate during a further deactivation time period defined relative to the first deactivation time.

3. A method according to claim 2, wherein the further activation time period is a time period of pre-determined length following the first activation time; and/or wherein the further deactivation time period defined relative to the first deactivation time is a time period of pre-determined length following the first deactivation time.

4. A method according to claim 1, wherein the first pre-determined time period defined relative to the start reference time is a time period of a pre-determined length following the start reference time; and/or
the second pre-determined time period defined relative to the end reference time is a time period of a pre-determined length preceding the end reference time.

5. A method according to claim 1, wherein the first pre-determined time period defined relative to the start reference time begins at the start reference time and/or wherein the second pre-determined time period defined relative to the end reference time finishes at the end reference time.

6. A method according to claim 1, wherein one or more of:
the first pre-determined time period defined relative to the start reference time;
the second pre-determined time period defined relative to the end reference time;
the further activation time period; and
a further deactivation time period defined relative to a first deactivation time;
are at least 5 minutes.

7. A method according to claim 1, wherein the further activation time period is less than 40 minutes.

8. A method according to claim 1, wherein the length of time between the start reference time and the end reference time is greater than 2 hours and the further activation time period is less than 60 minutes.

9. A method according to claim 1, wherein the step of determining the start reference time and end reference time comprises receiving an input from a user indicative of a start and/or end time, and further comprises:
presenting the user with one or more selectable options for the start and/or end reference time;
and wherein receiving an input from a user indicative of a start and/or end reference time comprises:
receiving an input indicative of the user selecting one of the one or more selectable options for the start reference time and/or end reference time.

10. A method according to claim 9, further comprising, prior to presenting the user with one or more selectable options for the start and/or end reference time,
determining the one or more selectable options based on one or more of:
previous user behaviour, such as previous user-initiated activation times for lighting devices; and
a predictable environmental condition, such as the time of sunrise, sunset, hours of daylight or hours of darkness.

11. A method according to claim 1, wherein the step of determining the set of lighting devices to be controlled in an automated mode comprises:
receiving an input from a user indicative of the set of lighting devices to be controlled.

12. A method according to claim 11, wherein the step of determining the set of lighting devices to be controlled in an automated mode further comprises:
presenting the user with one or more selectable options indicative of controllable lighting devices at a premises;
and wherein receiving an input from a user indicative of the set of lighting devices to be controlled comprises:
receiving an input indicative of the user selecting one of the one or more selectable options.

13. A method according to claim 9, wherein one or both of the steps of:
presenting the user with one or more selectable options indicative of the controllable lighting devices at the premises; and
presenting the user with one or more selectable options for the start and/or end reference time comprises:
displaying the one or more selectable options on a user-interface of a device, such as a thermostat, smartphone, tablet or the like.

14. A method according to claim 12, further comprising, prior to presenting the user with one or more selectable options indicative of the lighting devices to be controlled,
determining the one or more selectable options based on lighting devices that were previously activated by a user during periods of occupation of the premises.

15. A method according to claim 1, wherein determining that one or more criteria for operating in the automated mode are met comprises:
receiving a user input indicating that the premises is unoccupied and/or setting the mode of the control system to an automated or unoccupied mode.

16. A method according to claim 1, wherein determining that one or more criteria for operating in the automated mode are met comprises:
determining that user-initiated control of appliances at the premises has not occurred for a pre-determined time period; or
determining that a mobile device associated with a user is not present at the premises and/or that a mobile device associated with a user is more than a pre-determined distance from the premises.

17. A non-transient computer-readable medium comprising software code adapted, when executed on a data processing apparatus, to perform a method as set out in claim 1.

18. A method according to claim 1, wherein the further activation period is shorter than the first pre-determined time period defined relative to the start reference time.

19. A controller for controlling a lighting system including at least two lighting devices in an automated mode, the controller having:
a memory for storing information relating to the at least two lighting devices;
a communications interface for communicating with the at least two lighting devices; and
a processor operable to:
determine a set of lighting devices to be controlled in an automated mode;
determine a start reference time and an end reference time;
determine that one or more criteria for operating in the automated mode are met;
select, from deactivated lighting devices of the set of lighting devices, a lighting device to be the first activated lighting device;
activate the first activated lighting device during a first pre-determined time period relative to the start reference time, and wherein the first activated lighting device is activated at a randomly selected first activation time during the first pre-determined time period;
select, from the deactivated lighting devices of the set of lighting devices, one or more further devices to be further activated devices;
randomly select an activation time during a further activation time period for each of the one or more further activated devices, wherein the further activation time period is defined relative to the randomly selected first activation time such that the further activation time period begins at or after the randomly selected first activation time and ends after Y minutes, where Y is a number greater than zero;

activate all of the said one or more further activated devices at said selected activation time(s) during the further activation period;

select, from activated lighting devices of the set of lighting devices, a lighting device to be the first deactivated lighting device; and deactivate the first deactivated lighting device during a second pre-determined time period, defined relative to the end reference time, and wherein the first pre-determined time period and the second pre-determined time period are non-overlapping in time, and wherein the further activation time period and the second pre-determined time period are non-overlapping in time.

20. A lighting system for a premises, the lighting system comprising:
at least two lighting devices; and
a controller according to claim 19.

\* \* \* \* \*